(12) United States Patent
Hayashi (10) Patent No.: US 7,168,306 B2
(45) Date of Patent: Jan. 30, 2007

(54) TIRE AIR PRESSURE DETECTION SYSTEM

(75) Inventor: Hiromasa Hayashi, Oobu (JP)

(73) Assignee: Denso Corporation, Kariya (JP)

( * ) Notice: Subject to any disclaimer, the term of this patent is extended or adjusted under 35 U.S.C. 154(b) by 47 days.

(21) Appl. No.: 11/012,381

(22) Filed: Dec. 16, 2004

(65) Prior Publication Data

US 2005/0132791 A1   Jun. 23, 2005

(30) Foreign Application Priority Data

Dec. 18, 2003   (JP)   ............... 2003-421325

(51) Int. Cl.
*G01M 17/02*   (2006.01)
(52) U.S. Cl. .................. 73/146; 340/442; 340/447
(58) Field of Classification Search ....... 73/146–146.8; 340/442–447

See application file for complete search history.

(56) References Cited

U.S. PATENT DOCUMENTS

| | | | | |
|---|---|---|---|---|
| 6,218,936 | B1 * | 4/2001 | Imao ........................ | 340/447 |
| 6,340,929 | B1 * | 1/2002 | Katou et al. ............... | 340/447 |
| 6,362,731 | B1 * | 3/2002 | Lill ........................... | 340/445 |
| 6,604,415 | B2 | 8/2003 | Imao et al. | |
| 6,788,193 | B2 * | 9/2004 | King et al. ................. | 340/447 |
| 6,879,252 | B2 * | 4/2005 | DeZorzi et al. ............. | 340/505 |
| 6,911,904 | B2 * | 6/2005 | Nantz et al. ................ | 340/448 |
| 6,941,803 | B2 * | 9/2005 | Hirohama et al. ......... | 73/146.5 |

FOREIGN PATENT DOCUMENTS

| | | |
|---|---|---|
| JP | A-2002-257661 | 9/2002 |
| JP | A-2003-118333 | 4/2003 |

* cited by examiner

*Primary Examiner*—Edward Lefkowitz
*Assistant Examiner*—Jermaine Jenkins
(74) *Attorney, Agent, or Firm*—Posz Law Group, PLC (57) ABSTRACT

A tire air pressure detection system having a transmitter provided at each of a plurality of wheels provided with tires and sending out a detection signal corresponding to the air pressure of the tire attached to the corresponding wheel and a receiver provided at the chassis side and provided with first antennas arranged near the transmitters of the plurality of wheels and a first controller receiving detection signals through the first antennas and finding the air pressures of the tires provided at the plurality of wheels based on the detection signals, wherein the receiver is designed so that the first controller measures the strength of each the detection signal, sets a power control signal in accordance with that strength, then sends the power control signal to the transmitter originating the detection signal, and each transmitter is provided with a second antenna receiving its corresponding power control signal and a second controller controlling a transmission power for sending the detection signal based on the received power control signal.

2 Claims, 8 Drawing Sheets

| Lb | BIT PATTERN | TRANSMISSION POWER |
|---|---|---|
| 12≦Lb | 011 | 12dB |
| 8≦Lb≦11 | 010 | 8dB |
| 4≦Lb≦7 | 001 | 4dB |
| -3≦Lb≦3 | 000 | 0dB |
| -7≦Lb≦-4 | 100 | -4dB |
| -11≦Lb≦-8 | 101 | -8dB |
| Lb≦-12 | 110 | -12dB |
| ACKNOWLEDGE NOT RECEIVED | 111 | MAXIMUM TRANSMISSION POWER |

TIRE AIR PRESSURE DETECTION SYSTEM

BACKGROUND OF THE INVENTION

1. Field of the Invention

The present invention relates to a direct type of tire air pressure detection system which directly attaches transmitters provided with pressure sensor to wheels to which tires are attached, has the transmitters send out detection signals from the pressure sensors, and has a receiver attached to the chassis side receive them so as to detect the tire air pressure.

2. Description of the Related Art

In the past, one type of tire air pressure detection system has been the direct type. In this type of tire air pressure detection system, the wheel side where tires are attached has transmitters provided with pressure sensors directly attached to them. The chassis side has antennas and a receiver provided at it. When detection signals from the pressure sensors are sent from the transmitters, the detection signals are received by the receiver through the antennas and the tire air pressure is detected (for example, see Japanese Unexamined Patent Publication (Kokai) No. 14-257661).

In this type of tire air pressure detection system, transmitters are attached to all of the wheels while antennas are provided near each of the transmitters. Therefore, the antennas receive the detection signals sent from the corresponding transmitters.

Figure 8A:
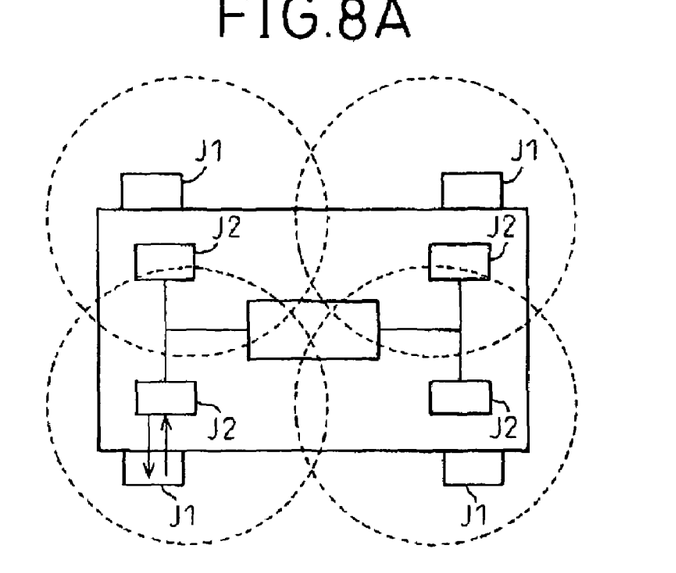
FIGS. 8A and 8B are views of the receivable range of a detection signal sent by a transmitter in a conventional tire air pressure detection system.

However, if the transmission power of a transmitted detection signal is large, as shown by the broken line in the schematic view of the receivable range shown in FIG. 8A, the receivable range of the detection signal sent by one transmitter J1 will extend up to an antenna J2 corresponding to another transmitter J1 and a detection signal sent from the one transmitter J1 will end up being received by the other antenna J2 not corresponding to it.

Figure 8B:
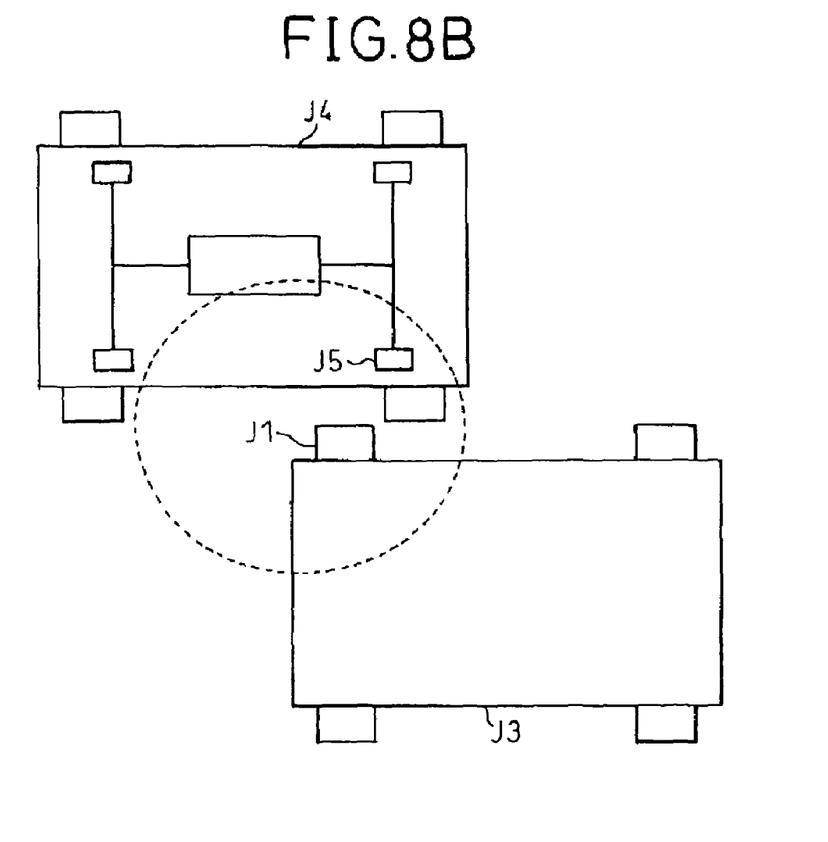

Further, even if not an antenna J2 of the same vehicle, for example, as shown by the broken line in the schematic view showing crosstalk with a nearby vehicle as shown in FIG. 8B, the detection signal sent by a transmitter J1 attached to the wheel of a vehicle J3 may be received by an antenna J5 corresponding to another vehicle J4. In this case, the other vehicle J4 will end up detecting the air pressure of a tire attached to a wheel of the vehicle J3 different from itself as the pressure of its own wheel J4, i.e., crosstalk will occur.

If crosstalk occurs in this way, there is the problem that the tire air pressure will not be able to be accurately detected.

SUMMARY OF THE INVENTION

An object of the present invention is to provide a tire air pressure detection system able to prevent crosstalk and accurately detect tire air pressure.

To attain the above object, according to a first aspect of the invention, there is provided a tire air pressure detection system having a transmitter (2) provided at each of a plurality of wheels (5a to 5d) provided with tires and sending out a detection signal corresponding to the air pressure of the tire attached to the corresponding wheel and a receiver (3) provided at the chassis (6) side and provided with first antennas (31) arranged near the transmitters (2) of the plurality of wheels and a first controller (32b) receiving detection signals through the first antennas (31) and finding the air pressures of the tires provided at the plurality of wheels (5a to 5d) based on the detection signals, wherein the receiver (3) is designed so that the first controller (32b) measures the strength of each the detection signal, sets a power control signal in accordance with that strength, then sends the power control signal to the transmitter (2) originating the detection signal, and each transmitter (2) is provided with a second antenna (23) receiving its corresponding power control signal and a second controller (22a) controlling a transmission power for sending the detection signal based on the received power control signal.

In this way, the first controller (32b) of the receiver (3) measures the strength of each detection signal, sets a power control signal in accordance with that strength, and controls the transmission power by which the corresponding transmitter (2) sends the detection signal based on that power control signal.

Therefore, it is possible to prevent crosstalk where the receivable range of a detection signal reaches a first antenna (23) corresponding to another transmitter (2) and a detection signal sent from that transmitter (2) ends up being received by another first antenna (23) not corresponding to it. Further, it is possible to prevent crosstalk where a detection signal of tire air pressure sent by a transmitter (2) of one vehicle (1) is mistakenly received by an antenna (8) of a tire air pressure detection system of another vehicle (7). Due to this, it is possible to realize a tire air pressure detection system able to prevent crosstalk and accurately detect tire air pressure.

Specifically, according to a second aspect of the present invention, the first controller (32b) sets as the power control signal a signal maintaining the strength of a detection signal in state if the strength of the detection signal is within a predetermined allowable range ($\Delta L$) with respect to a predetermined threshold value (Th), sets as the power control signal a signal for reducing the strength of the detection signal if larger than a value of the predetermined threshold value (Th) set with the predetermined allowable range ($\Delta L$) (Th±$\Delta L$), and sets as the power control signal a signal for increasing the strength of the detection signal if smaller than a value of the predetermined threshold value (Th) set with the predetermined allowable range ($\Delta L$)v (Th±$\Delta L$).

According to a third aspect of the invention, the first controller (32b) is designed to set as the power control signal a signal making each transmitter (2) send a detection signal at the maximum power in the state before receiving the detection signal.

In this way, before receiving the detection signal, each transmitter (2) is made to send a detection signal once at the maximum power, then can be suitably adjusted in strength of its detection signal.

Note that the reference numerals in parentheses of the means explained above show the correspondence with specific means described in the later explained embodiments.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
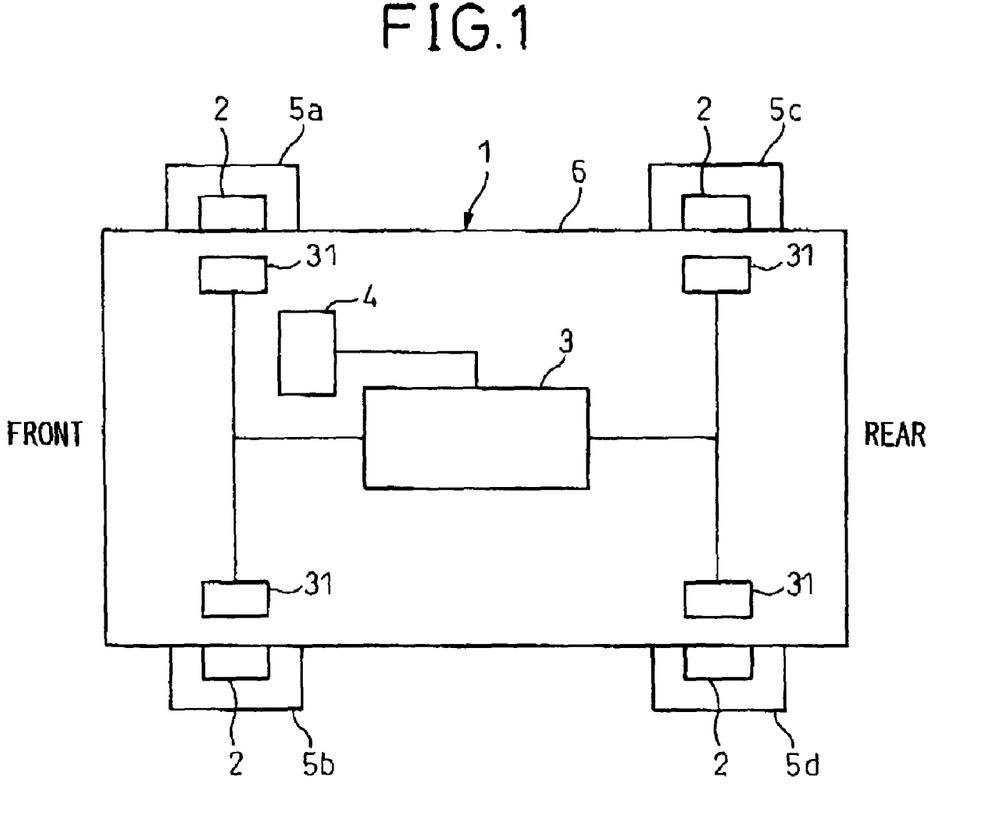
FIG. 1 is a schematic view of a tire air pressure detection system of a first embodiment of the present invention attached to a vehicle.

Below, an embodiment of the present invention will be explained based on the drawings. FIG. 1 is a schematic view of the state of a tire air pressure detection system according to a first embodiment of the present invention attached to a vehicle 1. The left direction of the sheet of FIG. 1 corresponds to the front of the vehicle 1, while the right direction of the sheet corresponds to the rear of the vehicle 1. Referring to this figure, the tire air pressure detection system in this embodiment will be explained.

As shown in FIG. 1, the tire air pressure detection system is attached to a vehicle 11 and is comprised of transmitters 2, a receiver 3, and a display 4.

Figure 2:
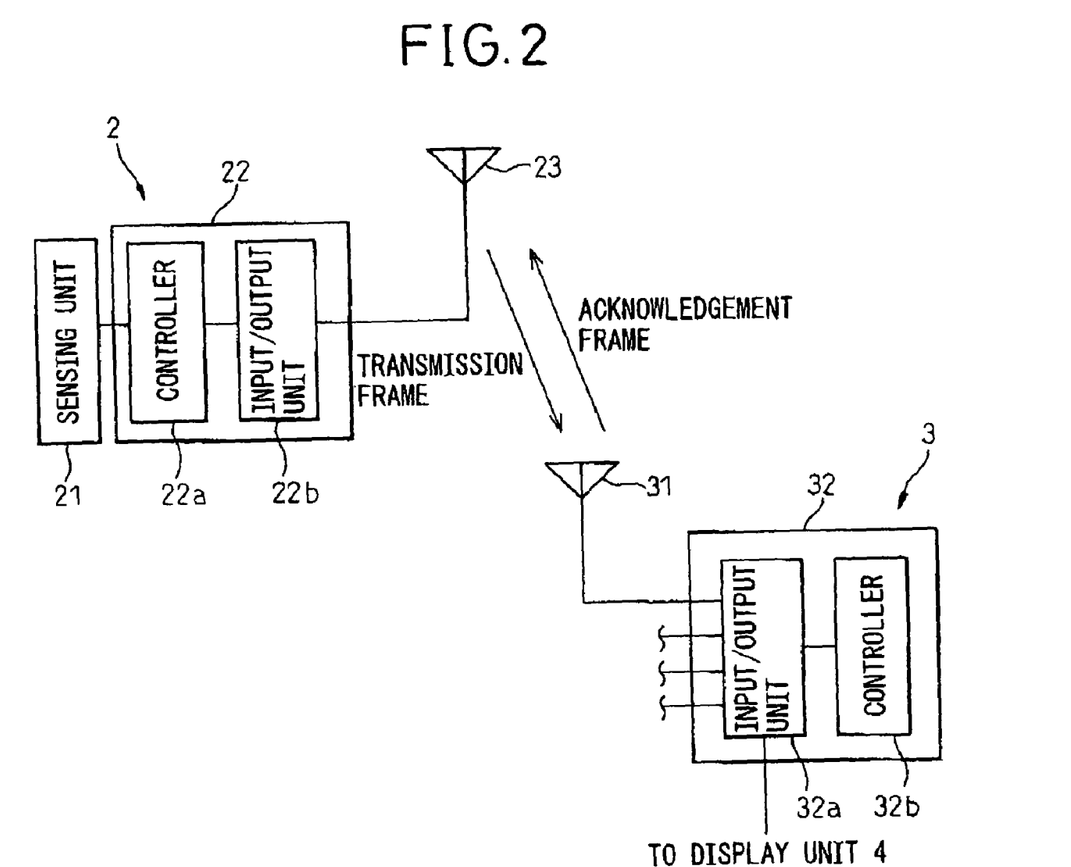
FIG. 2 is a view of the block configuration of a transmitter and receiver provided in the tire air pressure detection system of FIG. 1.

As shown in FIG. 1, the transmitters 2 are attached to the wheels 5a to 5d of the vehicle 1. They detect the air pressures of the tires attached to the wheels 5a to 5d and store data of detection signals showing the results of detection in transmission frames for transmission. The receiver 3 is attached to the chassis 5 side of the vehicle 1, receives the transmission frames transmitted from the transmitters 2, and performs various types of processing, computations, etc. based on the detection signals stored in the frames to find the tire air pressures. FIG. 2 shows the block configuration of a transmitter 2 and the receiver 3.

As shown in FIG. 2, each transmitter 2 is specifically provided with a sensing unit 21, a microcomputer 22, and an antenna (second antenna) 23.

The sensing unit 21 is comprised of for example a diaphragm type pressure sensor and outputs a detection signal corresponding to the tire air pressure.

The microcomputer 22 is a known one provided with a controller (second controller) 22a, input/output unit 22b, etc. and executes predetermined processing in accordance with a program stored in a memory (not shown) in the controller 22a.

The controller 22a receives the detection signal from the sensing unit 21, processes the signal as necessary, stores the data in the transmission frame, then sends the transmission frame to the input/output unit 22b. The processing for sending a signal to the input/output unit 22b is executed each predetermined period in accordance with the above program. Further, the controller 22a controls the transmission power for transmission of the transmission frame from the transmitter 2. Details of the control of the transmission power will be explained later.

The input/output unit 22b functions as an output unit for transmitting the transmission frame sent from the controller 22a through the antenna 23 toward the receiver 3 and functions as an input unit for receiving an acknowledgement frame including a power control signal sent from the receiver 3 side and sending it to the controller 22a.

The thus configured transmitter 2 is attached to an air valve at each of the wheels 5a to 5d, whereby the sensing unit 21 is arranged to be exposed at the inside of the tire. Due to this, it detects the air pressure of the corresponding tire and sends a transmission frame every predetermined period (for example, every minute).

Further, as shown in FIG. 2, the receiver 3 specifically is provided with antennas (first antennas) 31 and a microcomputer 32.

The same number of antennas 31 is provided as the number of tires, that is, the number of transmitters 2. Each antenna 31 is provided at a location corresponding to the position of one of the transmitters 2 at the chassis 6. For example, it is affixed to the chassis 6 at a position a predetermined distance from the corresponding transmitter 2.

The microcomputer 32 is a known one provided with an input/output unit 32a, a controller (first controller) 32b, etc. and executes predetermined processing in accordance with a program stored in a memory (not shown) of the controller 32b.

The input/output unit 32a functions as an input unit for receiving as input the transmission frames from the transmitters 2 received by the antennas 31 and sending the transmission frames to the controller 32b and functions as an output unit for transmitting acknowledgement frames storing power control signals sent from the controller 32b through the antennas 31 to the transmitter 2 side.

The controller 32b receives each transmission frame sent from the input/output unit 32a and performs various processing, computation, etc. stored in it based on the detection signal so as to find a tire air pressure and outputs an electrical signal corresponding to the tire air pressure found to the display unit 4. For example, the controller 32b compares a found tire air pressure with a predetermined threshold value Th and when detecting that the tire air pressure has fallen, outputs a signal to that effect to the display unit 4. Further, the controller 32b measures the receives signal strength (RSSI) of the transmission frame sent from the input/output unit 32a, that is, the transmission power level Lpw, sets a bit pattern corresponding to the signal power level Lpw, stores a power control signal showing that bit pattern in the acknowledgement frame, and outputs it to the input/output unit 32a.

Further, as shown in FIG. 1, the display unit 4 is provided at a location visible to the driver, for example, is set in the instrument panel of the vehicle 1. This display unit 4 notifies the driver of the drop of tire air pressure by displaying that a signal indicating that the tire air pressure has dropped has been sent from the controller 32b of the receiver 3.

Next, the processing to be executed by the tire air pressure detection system of the above configuration will be explained.

First, at the tire air pressure detection system, when a sensing unit 21 outputs a detection signal corresponding to the tire air pressure, the detection signal is processed as needed at the controller 22a, then stored in the transmission frame and output to the input/output unit 22b every predetermined period 22b. Due to this, the transmission frame is sent through the antenna 34 to the corresponding transmitter 2.

On the other hand, at the receiver 3 side, when a not shown ignition switch provided at the vehicle 1 is turned to the on position, the receiver 3 is powered and performs processing for detection of the tire air pressure. During the processing for detection of the tire air pressure, the transmission frame sent from each transmitter 2 is received by the corresponding antenna 31 of the receiver 31 and the received transmission frame is input to the controller 32b through the input/output unit 32a. Further, the controller 32b finds the tire air pressure by performing various signal processing, computation, etc. based on the detection signal stored in the transmission frame.

After this, the found tire air pressure is compared with a predetermined threshold value Th. When it is detected that the tire air pressure has dropped, processing is performed so that this fact is output to the display unit 4.

Further, in the tire air pressure detection system of this embodiment, processing for control of the transmission power is also performed. This processing for control of the transmission power will be explained with reference to the flow charts shown in FIG. 3 and FIG. 4 and the table shown in FIG. 5.

Figure 3:
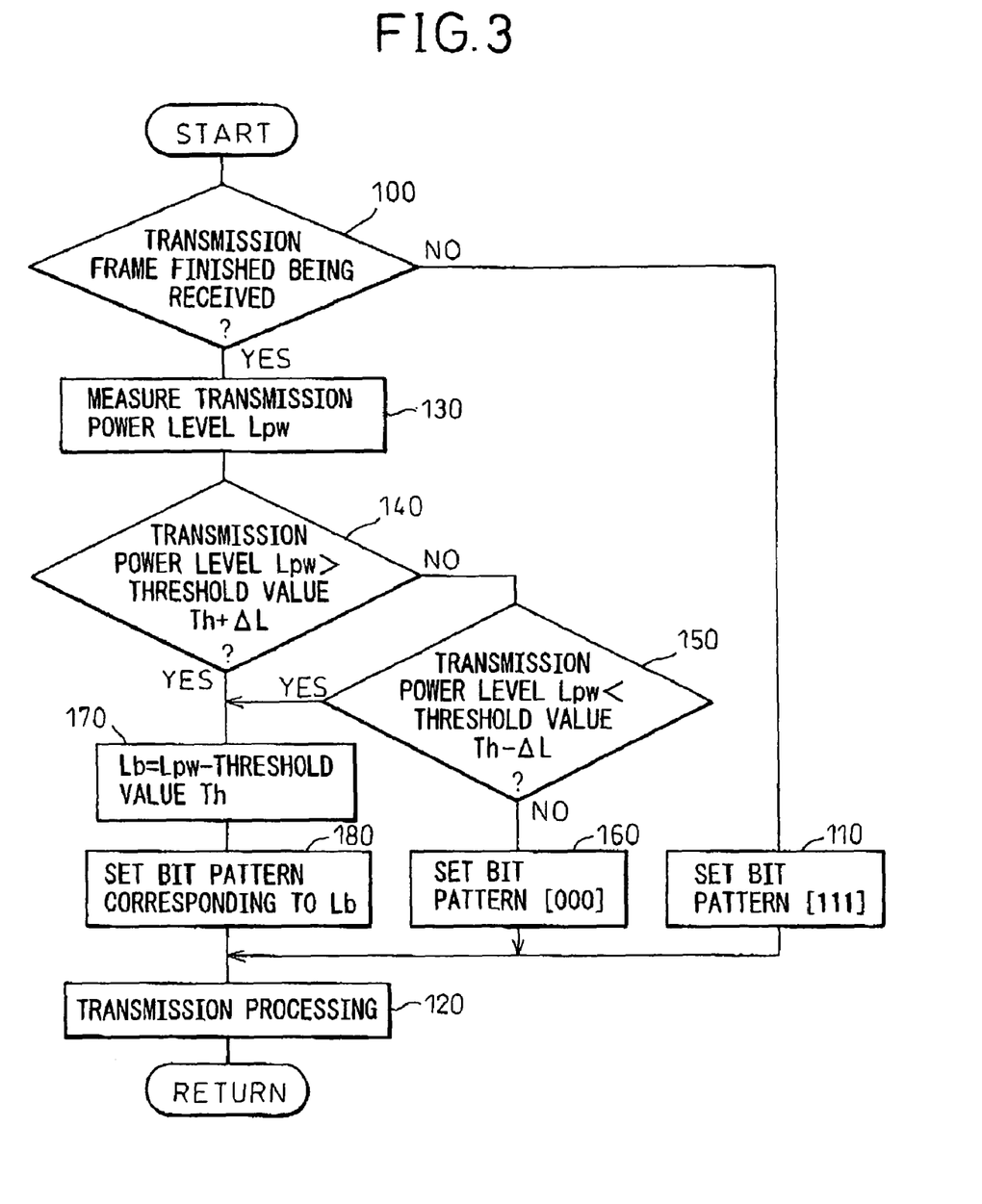
FIG. 3 is a flow chart of processing for control of the transmission power executed by a receiver.
Figure 4:
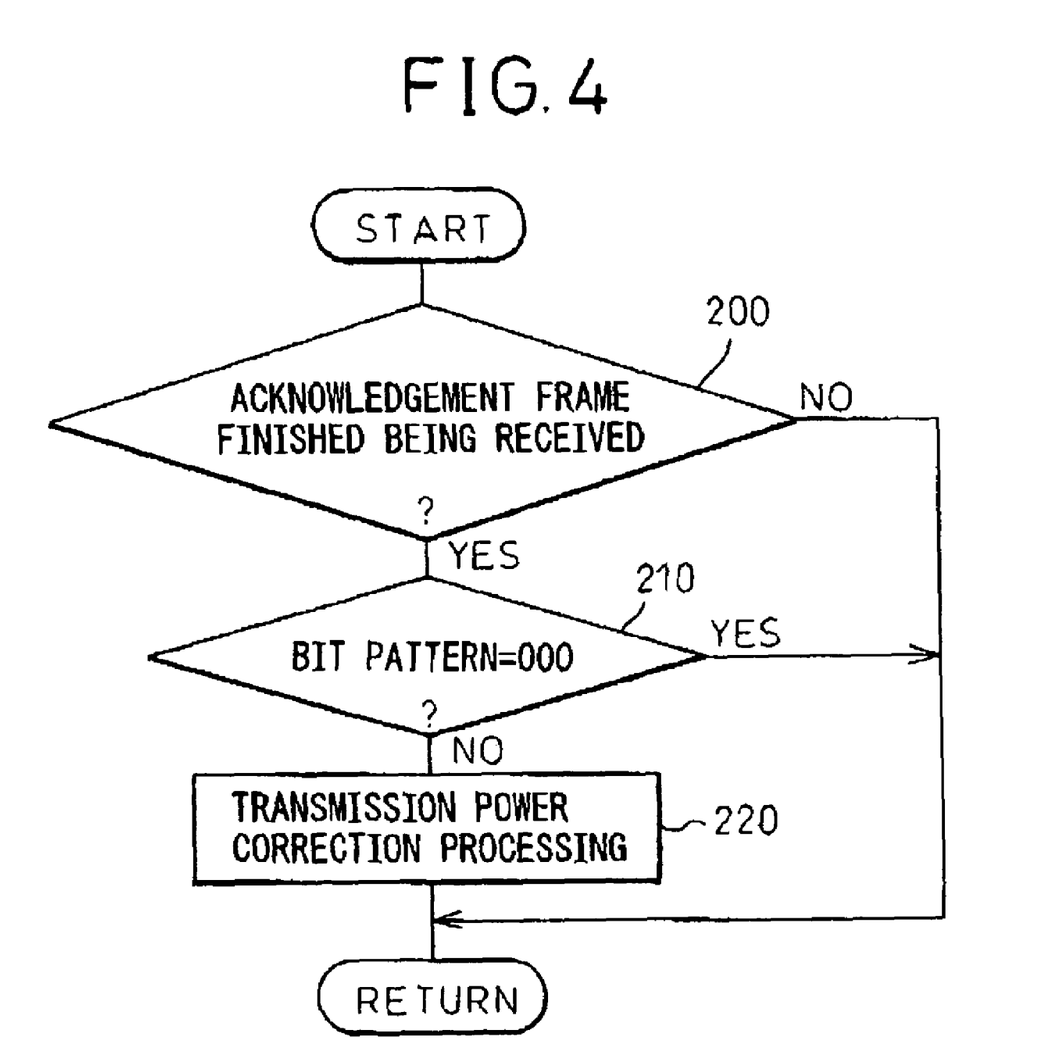
FIG. 4 is a flow chart of processing for control of the transmission power executed by a transmitter.
Figure 5:
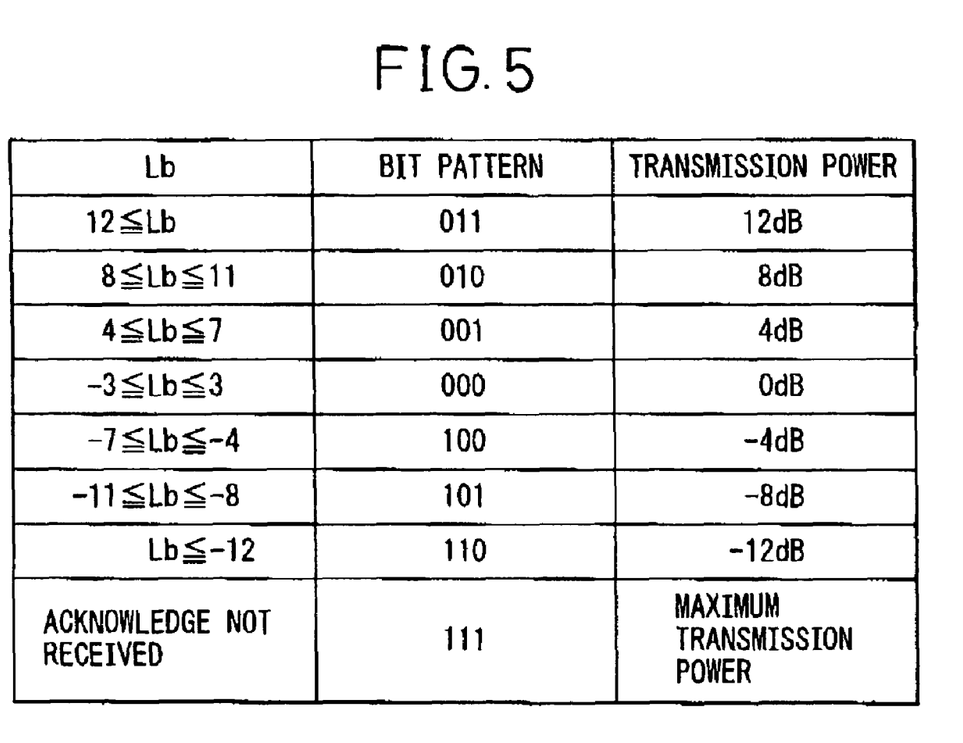
FIG. 5 is a diagram of the relationship of bit patterns and correction values of transmission power.

FIG. 3 is a flow chart of the processing for control of the transmission power performed by the receiver 3 side, while FIG. 4 is a flow chart of the processing for control of the transmission power performed by the transmitter 2 side. The processings shown in these flow charts are executed by controllers 22a and 32b provided at the receiver 3 and the transmitters 2. Further, FIG. 5 shows the correspondence between signal strengths of the transmission frames and bit patterns.

When the ignition switch provided at the vehicle 1 is turned to the on position, processing for control of the transmission power is executed. If this processing is executed, first, the receiver 3 side judges if the detection signal from a transmitter 2 has been received as shown at step 100 of FIG. 3. In this processing, since the detection signal is sent from the transmitter 2 every predetermined period, it is judged yes if that detection signal has been received.

Further, if the receiver 3 has still not received the detection signal, it is judged that no response to the signal has been received between the transmitter 2 and the receiver 3 and the routine proceeds to step 110, where processing is performed to set the bit pattern.

In the processing for setting the bit pattern, a bit pattern for forming the power control signal is set and is stored in the acknowledgement frame sent by the receiver 3 toward the transmitter 2. Specifically, the bit pattern is set based on the content stored in the control unit 32b. The relationship between the bit patterns set at this time and the contents stored in the control unit 32b is shown in FIG. 5. When the receiver 3 has still not received a transmission frame like in the current case, (111) shown at the bottommost level of FIG. 5, that is, data making the power value of the transmission frame sent by the transmitter 2 (transmission power value), the maximum transmission power, is set as the bit pattern.

In this way, the data indicating the bit pattern (111) is set in the acknowledgement frame, then the routine proceeds to step 120, where transmission processing is performed. Further, the acknowledgement frame in which the bit pattern for forming the power control signal is stored is sent from the receiver 3 toward the transmitter 2.

On the other hand, when the receiver 3 receives a transmission frame, at step 130, the transmission power level Lpw of the transmission frame is measured. At this time, the transmission power level Lpw is found to one decimal place.

Further, the routine proceeds to step 140, where it is judged if the transmission power level is larger than the predetermined threshold value Th plus the allowable range ΔL (Th+ΔL).

The threshold value Th spoken of here is set to a value whereby the value of the transmission power level Lpw becomes a value suitable as the strength of the signal received by the receiver 3 and is for example found experimentally. That is, when the strength of a signal received by the receiver 3 is that value (Th), only the antenna corresponding to a certain transmitter 2 can receive the detection signal from the transmitter 2. A value where other antennas 31 cannot accurately receive the signal due to distance is made the threshold value Th.

Further, when the transmission power level Lpw is larger or smaller than the threshold value Th, it is preferably increased or decreased so as to become the threshold value Th. However, when the transmission power level Lpw is close to the threshold value Th, there is no need for increasing or decreasing it. The range of the degree not requiring increase or decrease of the transmission power level Lpw is set as the allowable range ΔL.

Specifically, in this embodiment, when the transmission power level Lpw is larger or smaller than the threshold value Th, the power level is increased or decreased in steps of 4 dB in accordance with the magnitude of the Lpw. In this case, the threshold value Th is set to 100 dB and the allowable range ΔL is set to 3 dB.

Further, if judged no at step 140, it is judged that the transmission power level Lpw is not large and the routine proceeds to step 150, where it is judged if the transmission power level is smaller than the predetermined threshold value Th minus the allowable range ΔL (Th−ΔL). When judged no at this step as well, it is judged that the current value of the transmission power level Lpw has become a substantially suitable value and the routine proceeds to step 160, where it is judged that the current transmission power level Lpw is near the threshold value Th, (000) is set as the bit pattern, and it is judged there is no need for correction of the transmission power level Lpw. For example, if the value of the transmission power level Lpw is in the range of the threshold value Th (100 dB)±the allowable range ΔL (3 dB), it is judged no at step 130 and step 140 and the value is judged to be suitable.

Further, if judged yes at step.140 or step 150, it is judged there is a need for reducing the transmission power level Lpw and the routine proceeds to step 170.

At step 170, processing is executed to set the value of the transmission power level Lpw minus the threshold value Th as Lb. Due to this, for example, when the value of the transmission power level Lpw is 104 dB, Lb is computed as 4 dB, when 108 dB, 8 dB, and when 96 dB, −4 dB.

Further, the routine proceeds to step 180, where processing is performed for setting a bit pattern in accordance with Lb. As shown in FIG. 5, when Lb is 4 to 7, the bit pattern is set as (001), while when Lb is −11 to −8, it is set as (101). That is, the larger the transmission power level Lpw compared with the threshold value Th, the greater the reduction of the correction value of the transmission power set, while conversely the smaller the transmission power level Lpw compared with the threshold value Th, the greater the increase of the correction value of the transmission power.

If the bit pattern is set in this way, the data showing the bit pattern set in the above way is stored in the acknowledgement frame, then the routine proceeds to step 120, where transmission processing is performed. Further, an acknowledgement frame in which the bit pattern forming the power control signal is stored is sent from the receiver 3 toward the transmitter 2. After this, this processing is repeatedly executed during the period in which the ignition switch is at the on position. The bit pattern is set in accordance with the transmission power level Lpw each time.

Next, at the transmitter 2 side, as shown at step 200 of FIG. 4, it is judged if an acknowledgement frame storing the power control signal has been received from the receiver 3. In this processing, if an acknowledgement frame storing a power control signal is sent from the receiver 3 side by the transmission processing shown at step 120 of FIG. 3, it is judged that this frame has been received.

Further, if judged yes at step 200, the routine proceeds to step 210, while if judged no, the processing is ended as it is. At step 210, it is judged if the bit pattern has been set to (000).

At this time, if the bit pattern is (000), the current transmission power level Lpw becomes a substantially suitable value, so the processing is ended without adjusting the transmission power level Lpw. Further, if the bit pattern is other than (000), the current transmission power level Lpw is not suitable, so it is judged that there is a need for correction and the routine proceeds to step 220, where control of the transmission power is executed.

Due to this, the transmitter 2 performs processing so that the transmission power level Lpw is adjusted so as to obtain a signal strength in accordance with the bit pattern stored in the acknowledgement frame or the level Lpw is set to the maximum power. Due to this, the transmission power level Lpw is corrected and set to a suitable value.

A timing chart of the case of execution of the processing for control of the transmission power in the embodiment explained above is given in FIG. 6.

Figure 6:
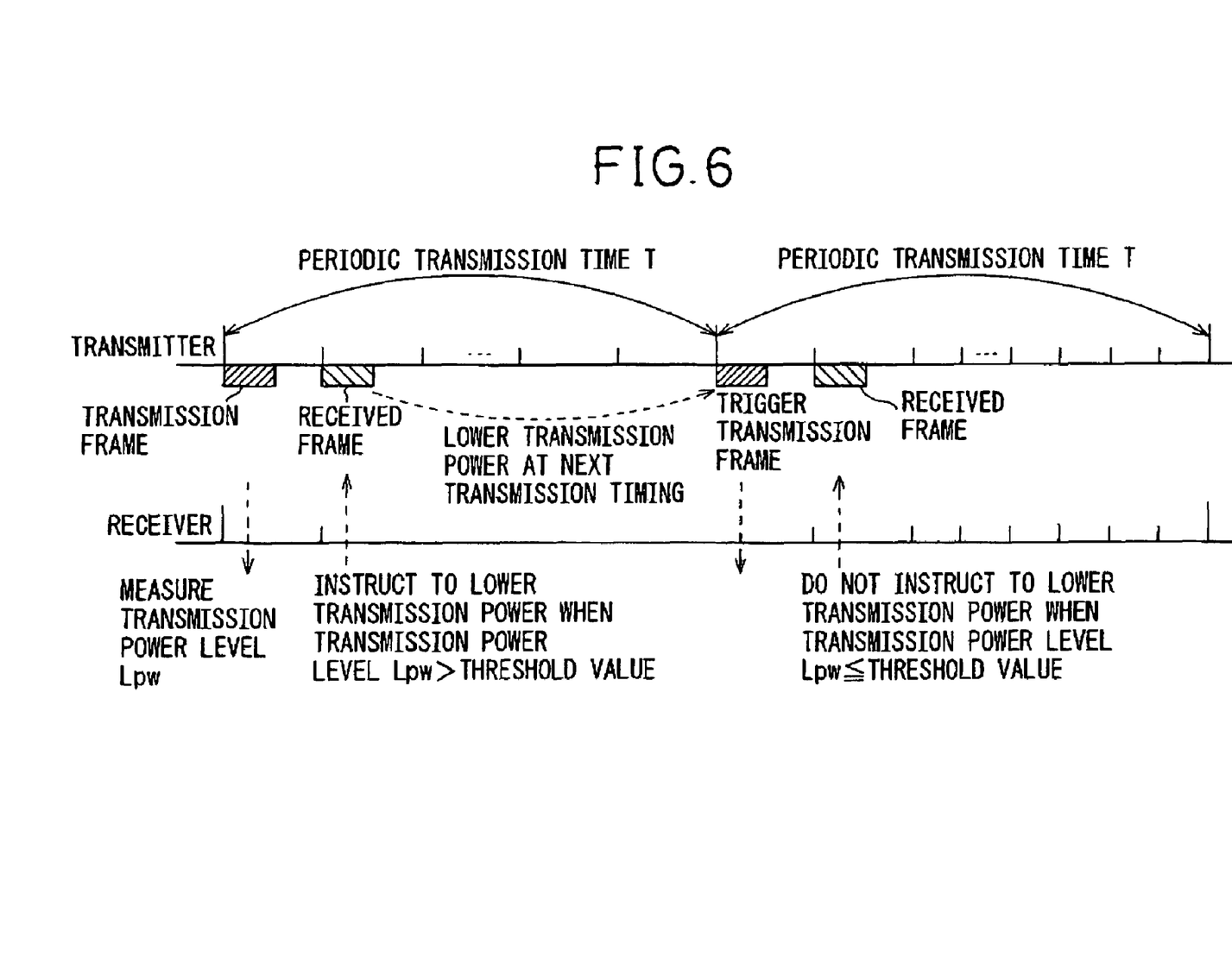
FIG. 6 is a timing chart of the case of control of the transmission power.

As shown in the figure, when a transmission frame is sent from a transmitter 2, the receiver 3 receives the transmission frame and measures the transmission power level Lpw. Due to this, if a bit pattern indicating an instruction to lower the transmission power level Lpw is set, that bit pattern is stored in the acknowledgement frame and sent from the receiver 3.

The transmitter 2 receives this signal, whereupon processing is executed for adjusting the transmission power in accordance with the bit pattern stored in the acknowledgement frame. When the next transmission period of the detection signal arrives, the detection signal is sent toward the receiver 3 by the transmission power level Lpw after correction by the control of the transmission power.

Therefore, in the receiver 3, control of the transmission power is executed again based on the transmission power level Lpw showing the transmission frame again. However, since the transmission power level Lpw is already set to a suitable value, the acknowledgement frame at that time does not include any bit pattern showing an instruction for lowering the transmission power level Lpw, but includes a bit pattern not changing the transmission power level Lpw and is sent toward each transmitter 2. Further, this state is maintained until the transmission power level Lpw changes again.

Figure 7A:
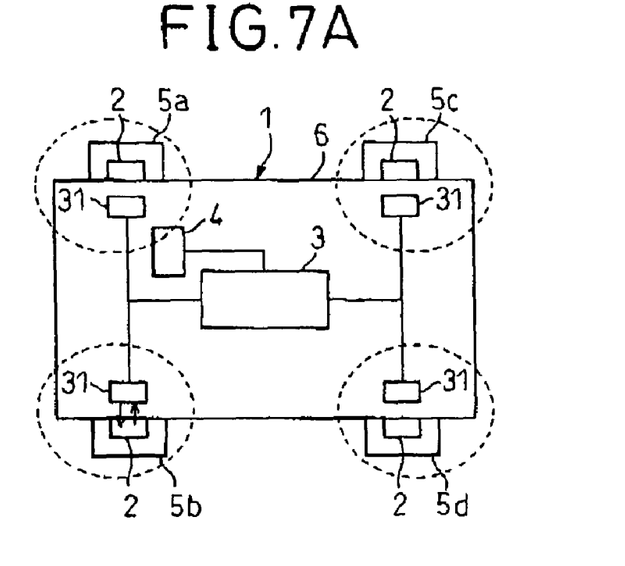
FIGS. 7A and 7B are views of a receivable range of a detection signal sent by a transmitter in the case of control of the transmission power in the tire air pressure detection system.
Figure 7B:
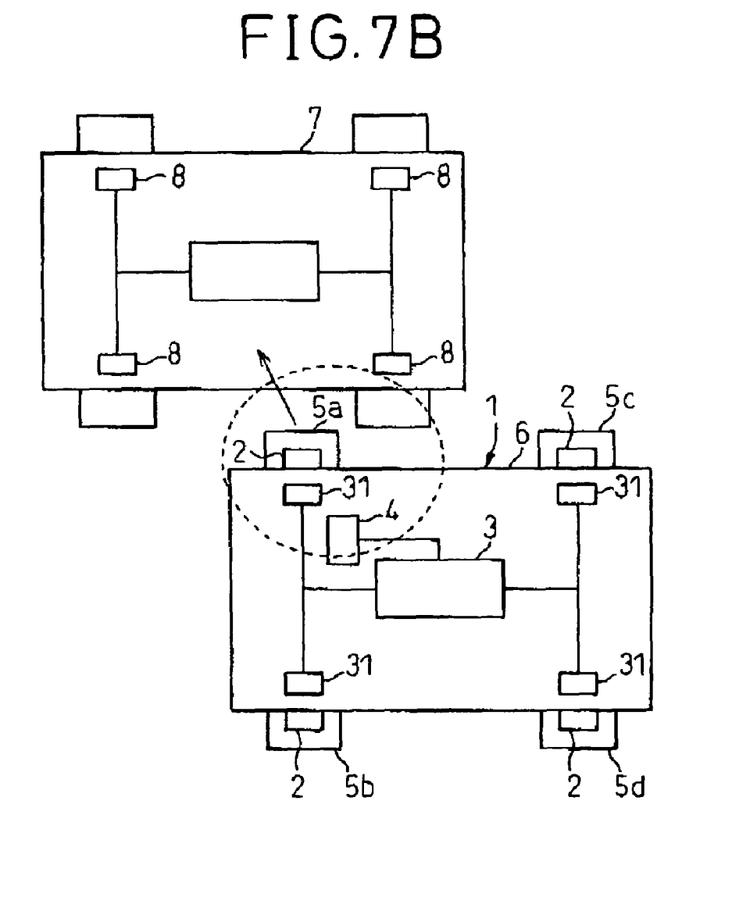

As explained above, in the tire air pressure detection system of this embodiment, the transmission power level Lpw of the detection signal sent by each transmitter 2 is adjusted to become suitable. Accordingly, the receivable range of the detection signal sent by each transmitter 2 becomes as shown in FIG. 7A and FIG. 7B. That is, the detection signal sent from each transmitter 2 can only be received by the antenna corresponding to that transmitter 2 and cannot be received by any other antenna. Further, even if there is a vehicle 7 nearby, the detection signal sent by a transmitter 2 of the vehicle 1 will not reach an antenna 8 attached to the chassis of that nearby vehicle 7.

Therefore, it is possible to prevent crosstalk where the receivable range of a detection signal reaches a first antenna 23 corresponding to another transmitter 2 and a detection signal sent from that transmitter 2 ends up being received by another first antenna 23 not corresponding to it. Further, it is possible to prevent crosstalk where a detection signal of tire air pressure sent by a transmitter 2 of one vehicle 1 is mistakenly received by an antenna 8 of a tire air pressure detection system of another vehicle 7.

Therefore, it is possible to realize a tire air pressure detection system which can prevent crosstalk and can accurately detect tire air pressure.

Other Embodiments

In the above embodiments, the transmission power level of the detection signal in each transmitter 2 was made a suitable value, but conversely it is also possible to adjust the power level in the same way as with the power control signal in the receiver 3.

Further in the above embodiments, a transmission frame was sent from each transmitter 2 every predetermined period, but this is simply an example. There is no need for it to be transmitted every predetermined period. For example, it is also possible that a transmission frame be sent from a transmitter 2 when a transmission command signal is sent from the receiver 3.

Note that the steps shown in the figures corresponding to the means executing the various processing.

While the invention has been described with reference to specific embodiments chosen for purpose of illustration, it should be apparent that numerous modifications could be made thereto by those skilled in the art without departing from the basic concept and scope of the invention.

What is claimed is:

1. A tire air pressure detection system comprising:
a transmitter provided at each of a plurality of wheels provided with tires and sending out a detection signal corresponding to air pressure of each tire attached to each corresponding wheel; and
a receiver provided at a chassis side and provided with first antennas arranged near said transmitters of said plurality of wheels and a first controller receiving detection signals through the first antennas and finding the air pressures of said tires provided at said plurality of wheels based on said detection signals, wherein
said receiver is designed so that said first controller measures a strength of each said detection signal, sets a power control signal in accordance with that strength, then sends the power control signal to the transmitter originating said detection signal, and
each transmitter is provided with a second antenna receiving its corresponding power control signal and a second controller controlling a transmission power for sending said detection signal based on said received power control signal, wherein said first controller
sets as said power control signal a signal maintaining the strength of said detection signal in state if the strength of said detection signal is within a predetermined allowable range ($\Delta L$) with respect to a predetermined threshold value (Th), sets as said power control signal a signal for reducing the strength of said detection signal if larger than a value of said predetermined threshold value (Th) set with said predetermined allowable range ($\Delta L$) (Th$\pm\Delta L$), and sets as said power control signal a signal for increasing the strength of said detection signal if smaller than a value of said predetermined threshold value (Th) set with said predetermined allowable range ($\Delta L$) (Th$\pm\Delta L$).

2. A tire air pressure detection system as set forth in claim 1, wherein said first controller is designed to set as said power control signal a signal making each said transmitter send said detection signal at the maximum power in the state before receiving said detection signal.

* * * * *